United States Patent
Mustafa et al.

(10) Patent No.: US 12,361,589 B2
(45) Date of Patent: Jul. 15, 2025

(54) TRAILER HEIGHT AND HITCH BALL CALCULATION

(71) Applicant: Ford Global Technologies, LLC, Dearborn, MI (US)

(72) Inventors: Ali Mustafa, Dearborn, MI (US); Amey Karnik, Canton, MI (US); Haitham Alanssari, Novi, MI (US); Yashwanth Reddy Gatla, Beavercreek, OH (US); Cameron Husted, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 17/841,157

(22) Filed: Jun. 15, 2022

(65) Prior Publication Data
US 2023/0410359 A1    Dec. 21, 2023

(51) Int. Cl.
*G06T 7/73* (2017.01)
*B60R 1/22* (2022.01)

(52) U.S. Cl.
CPC .............. *G06T 7/74* (2017.01); *B60R 1/22* (2022.01); *B60R 2300/307* (2013.01); *G06T 2207/30204* (2013.01); *G06T 2207/30252* (2013.01)

(58) Field of Classification Search
CPC .......... G06T 7/74; G06T 2207/30204; G06T 2207/30252; G06T 2207/30264; B60R 1/22; B60R 2300/307; B60R 1/23; B60R 11/02; B60R 2300/60; B60R 2300/607; G06F 18/22; G06V 10/74; G06V 10/75; G06V 30/19; B06R 1/26; B60W 30/06
See application file for complete search history.

(56) References Cited

U.S. PATENT DOCUMENTS

| | | | |
|---|---|---|---|
| 9,102,271 B2 * | 8/2015 | Trombley | B60R 1/003 |
| 9,499,018 B2 * | 11/2016 | Gehrke | B60R 1/003 |
| 10,706,291 B2 | 7/2020 | Diessner et al. | |
| 10,744,943 B1 | 8/2020 | Jales Costa et al. | |

(Continued)

FOREIGN PATENT DOCUMENTS

| | | | | |
|---|---|---|---|---|
| CN | 114627395 A * | 6/2022 | | B64C 27/08 |
| DE | 102016117284 A1 * | 3/2018 | | B60D 1/06 |

OTHER PUBLICATIONS

Rosebrock, "Find distance from camera to object/marker using Python and OpenCV" [online], Jan. 19, 2015 [retrieved on Aug. 19, 2024], updated Jul. 8, 2021. Retrieved from the internet: <URL: https://pyimagesearch.com/2015/01/19/find-distance-camera-objectmarker-using-python-opencv/>. (Year: 2021).*

*Primary Examiner* — Matthew C Bella
*Assistant Examiner* — Nicholas John Helco
(74) *Attorney, Agent, or Firm* — Lorne Forsythe; Price Heneveld LLP

(57) ABSTRACT

A towing assist system for a vehicle includes a marker positioned on a trailer. An imaging device is in connection with the vehicle and configured to capture image data demonstrating a rearward-directed field of view. A controller processes the image data depicting the characteristic marker and detects the characteristic marker in the image data. The controller further identifies a coupler position or coupler height of a coupling interface of the trailer in response to a position of the marker in at least one frame of the image data.

17 Claims, 8 Drawing Sheets

(56) References Cited

U.S. PATENT DOCUMENTS

| | | |
|---|---|---|
| 10,906,583 B2 | 2/2021 | Li et al. |
| 11,050,933 B2 | 6/2021 | Chen et al. |
| 2009/0317001 A1* | 12/2009 | Sakai ................... G06V 40/161 |
| | | 382/218 |
| 2014/0303849 A1* | 10/2014 | Hafner ................... H04N 7/183 |
| | | 701/1 |
| 2017/0177973 A1* | 6/2017 | Hu ............................ G06T 7/13 |
| 2022/0212599 A1* | 7/2022 | Gali ......................... B60R 1/26 |

\* cited by examiner

TRAILER HEIGHT AND HITCH BALL CALCULATION

FIELD OF THE INVENTION

The present invention generally relates to towing assist systems and, more particularly, to towing assist systems employing trailer angle detection through image processing.

BACKGROUND OF THE INVENTION

Reversing a vehicle while towing a trailer can be challenging for many drivers, particularly for drivers that drive with a trailer on an infrequent basis or with various types of trailers. Some systems used to assist a driver in backing a trailer rely on trailer angle measurements to determine the position of the trailer relative to the vehicle. Thus, the accuracy and reliability of the trailer angle measurements can be critical to the operation of the towing assist system.

SUMMARY OF THE INVENTION

According to one aspect of the present invention, a towing assist system for a vehicle comprises a marker positioned on a trailer. An imaging device is in connection with the vehicle and configured to capture image data demonstrating a rearward-directed field of view. A controller processes the image data depicting the characteristic marker and detects the characteristic marker in the image data. The controller further identifies a coupler position or coupler height of a coupling interface of the trailer in response to a position of the marker in at least one frame of the image data.

Various embodiments of the invention can include any one or a combination of the following features:
- the marker comprises a plurality of shapes or characters, and the controller is configured to access a template and identify a relative scale of the marker in the image data;
- the marker is affixed to the trailer within the field of view in an indeterminate location relative to the coupler position;
- the indeterminate location of the marker is not predetermined or accessible in a memory of the controller prior to the identification of the coupler position by processing the image data;
- the controller is further configured to transform a perspective of the image data to a view perpendicular to the marker or a bird's-eye view;
- the controller is further configured to compare a scale of the marker in the image data to a plurality of scaled templates and identify a closest match template of the plurality of scaled templates;
- the controller is further configured to calculate the coupler height of a coupling interface of the trailer based on a scale of the closest match template;
- the controller is further configured to detect a template angle of the characteristic marker in the image data and select a closest match template based on the template angle;
- the controller is further configured to identify a plurality of marker positions of the marker at a plurality of different trailer angles and store the plurality of marker positions identified at the plurality of different trailer angles;
- the controller is further configured to identify a plurality of marker positions of the marker at the plurality of different trailer angles in response to the vehicle being maneuvered along a path that changes a template angle of the marker based on the trailer angle;
- the controller is further configured to determine a radius of an arc fit to the marker positions at the plurality of different trailer angles;
- the controller is further configured to identify the position of the coupling interface based on radius and arc of the marker positions at the plurality of different trailer angles; and/or
- the marker comprises one or more features comprising at least one characteristic shape, character, or symbol, and the proportions of the features are predefined and accessible by the controller.

According to another aspect of the present invention, a method for identifying a position of a coupler interface between a vehicle and a trailer is disclosed. The method includes maneuvering the vehicle varying a trailer angle between the vehicle and the trailer and capturing image data depicting a marker positioned on a trailer in a field of view at a plurality of trailer angles. The method further includes detecting the marker in the image data at each of the plurality of trailer angles and identifying a coupler position of a coupling interface of the trailer based on a marker position of the characteristic marker at each of the plurality of trailer angles.

Various embodiments of the invention can include any one or a combination of the following features:
- the marker affixed to the trailer within the field of view in an indeterminate location relative to the coupler position;
- identifying a plurality of marker positions of the marker at the plurality of trailer angles and storing the plurality of marker positions identified at the plurality of different trailer angles;
- wherein the coupler position is identified by fitting an arc to the plurality of marker positions; and/or
- wherein the coupling position is identified as the intersection of rays extending through the marker positions perpendicular to the arc.

According to another aspect of the present invention, a towing assist system for a vehicle comprises a marker positioned on a trailer. The marker is affixed to the trailer within the field of view in an indeterminate location relative to a coupler position. An imaging device is in connection with the vehicle and configured to capture image data demonstrating the marker in a rearward-directed field of view. A controller processes the image data depicting the characteristic marker and detects the marker in the image data at each of the plurality of trailer angles. The controller further determines a plurality of marker positions of the marker in the image data at the plurality of trailer angles and identifies the coupler position of a coupling interface of the trailer to the vehicle based on marker positions at the plurality of trailer angles. In some implementations, the coupler position is identified by one of fitting an arc to the plurality of marker positions and determining the intersection of rays extending perpendicular to the arc through the marker positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
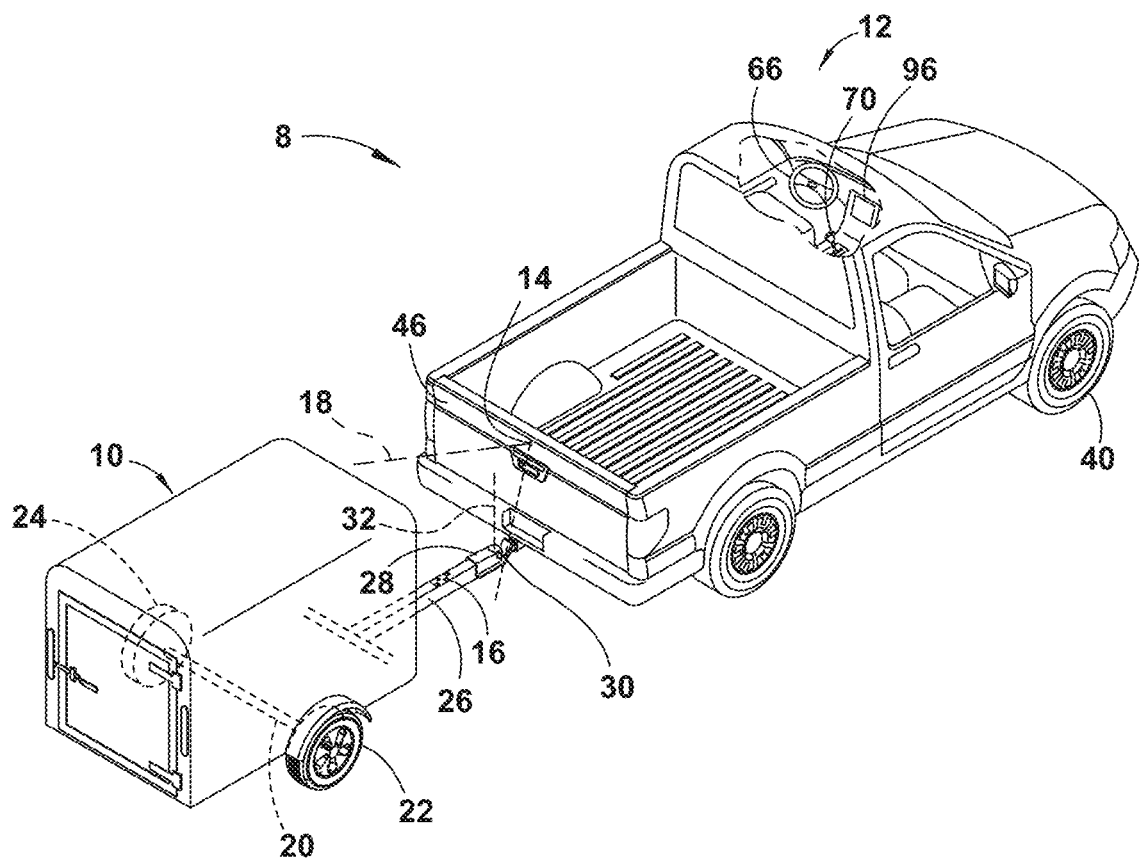
FIG. 1 is a top perspective view of a vehicle attached to a trailer with one embodiment of a trailer angle sensor for operating a towing assist system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Figure 2:
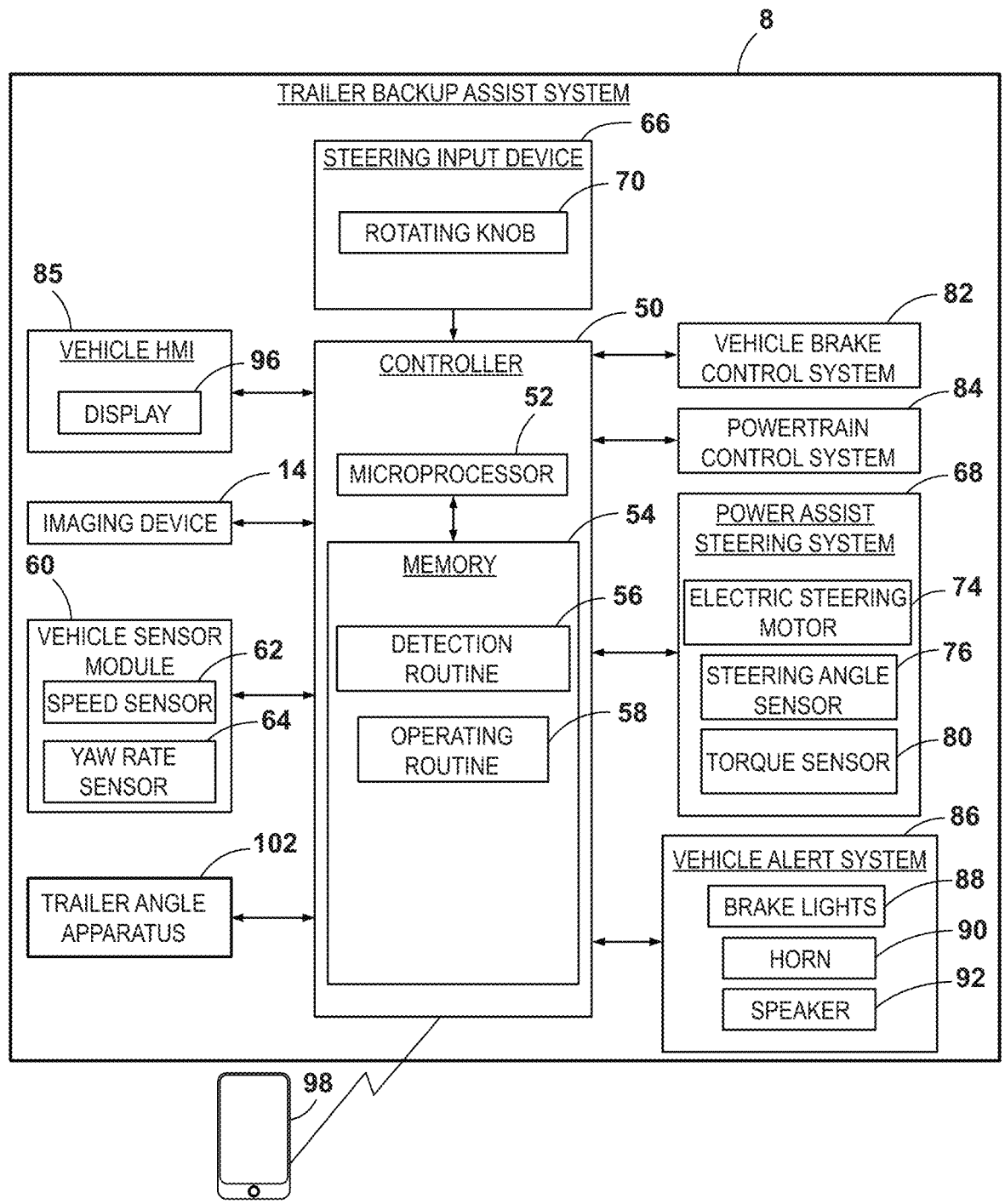
FIG. 2 is a block diagram illustrating one embodiment of the towing assist system.
Figure 3:
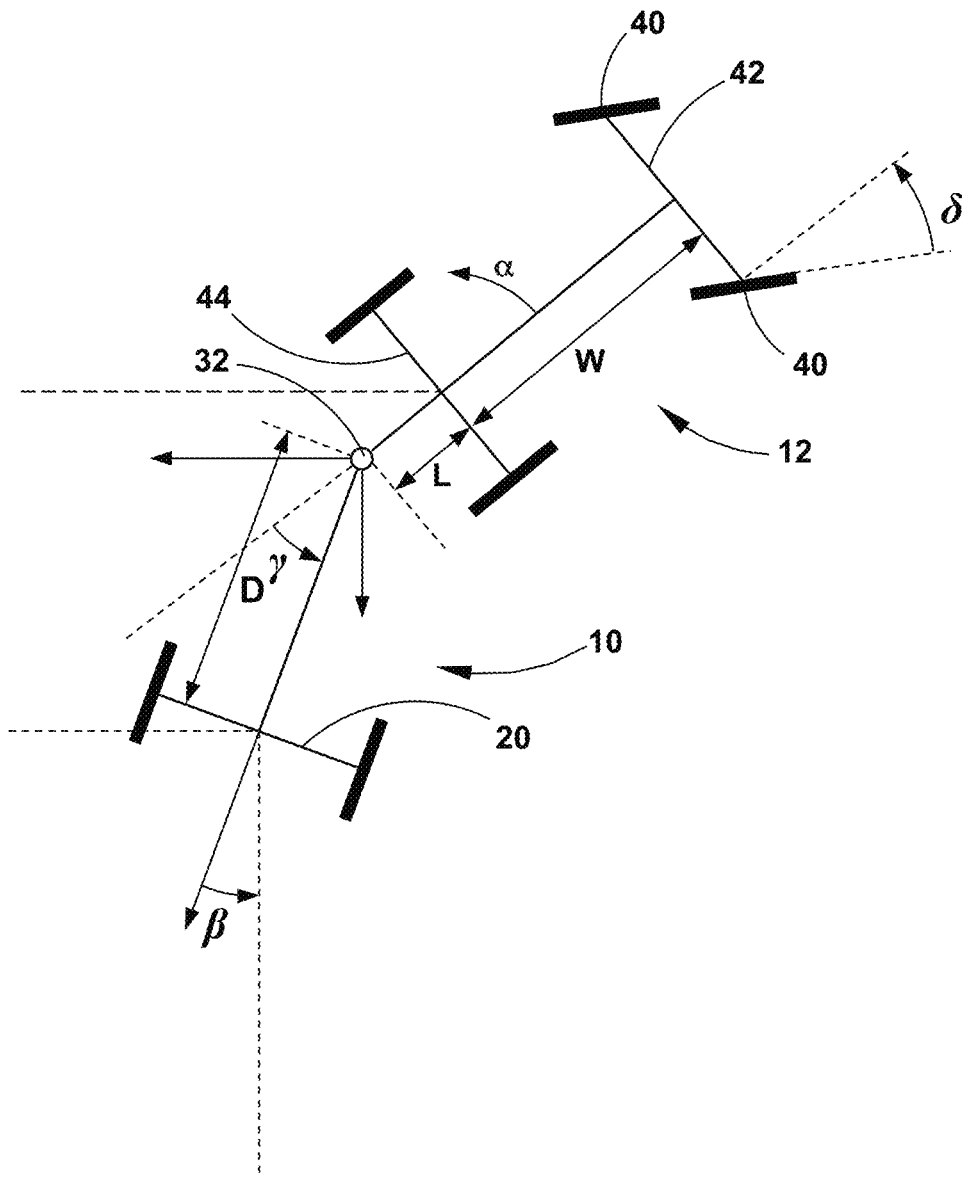
FIG. 3 is a kinematic model of the vehicle and trailer shown in FIG. 1.

Referring to FIGS. 1, 2, and 3, the disclosure generally provides for a towing assist system 8 for maneuvering a trailer 10 attached to a vehicle 12. The system 8 may allow a driver of the vehicle 12 to specify a desired curvature of a path of the trailer 10 or provide for autonomous or semi-autonomous operation to a designated target location (e.g., a parking location). To achieve such operation, the position and orientation of various portions of the vehicle 12 and the trailer 10 may be identified and monitored by the system 8. In particular, the system 8 may identify and track a trailer angle γ (shown in FIG. 3) between the vehicle 12 and the trailer 10 to provide feedback to the system 8 throughout operation. However, accurately detecting a height and position of a vehicle-trailer interface, denoted herein as a coupler position $P_C$, may be challenging when considering the wide variations in vehicle configurations and trailer hitch types. Additionally, weather-related visibility conditions, lighting conditions, trailer angle ranges, and various additional variables may cause variations in measurement of the dimensions and orientation of the vehicle 12 and the trailer 10. In order to enhance the reliability of determining and tracking the dimensions and orientation of the vehicle 12 and the trailer 10, the disclosure provides for a novel system 8 for detecting a height and position of an interface between the vehicle 12 and the trailer 10.

In various implementations, the disclosure provides for the determination of a coupler height $H_C$ and a coupler position $P_C$ relative to a camera or imaging device 14 (e.g., a reverse camera) of the vehicle 12. The detection process for the coupler height $H_C$ and coupler position $P_C$ may process image data from the imaging device 14 to detect a target or characteristic marker 16 affixed to a portion of the trailer within a field of view 18 of the camera or imaging device 14. Attributes, including features, dimensions, and proportions of the marker 16, may be stored by the system 8 and compared to the marker 16 in the image data. In operation, the system 8 may compare the proportions of the marker 16 to determine the coupler height $H_C$ and coupler position $P_C$. This process may be accomplished without apriori programming or measurement of the position of the marker 16 on the trailer 10. That is, the position of the marker 16 on the trailer 10 may be previously undefined, indeterminate, or not programmed in the system 8 prior to the detection processes provided by the disclosure.

As described in further detail in reference to FIGS. 4-8, in various examples, the disclosure may provide for the determination of the coupler height $H_C$ and coupler position $P_C$ without requiring that the marker 16 be positioned in a predetermined location. Instead, the system 8 may only require that the marker 16 be visible in the field of view 18 of the imaging device 14 to successfully determine the coupler height $H_C$ and coupler position $P_C$. Such detection may limit the initial programming or setup steps to access and implement assisted operation of the vehicle 12 to navigate the trailer 10. The intervening discussion describes the general operation of the system 8 to provide for assisted operation of the vehicle 12 in combination with the trailer 10. Again, a detailed discussion of methods associated with the determination or calculation of the coupler height $H_C$ and a coupler position $P_C$ are discussed in reference to FIGS. 4-8.

Referring still to FIGS. 1, 2, and 3, the vehicle 12 is embodied as a pickup truck that is pivotally attached to one embodiment of the trailer 10. The trailer 10 may comprise a frame in connection with an axle 20 operably coupled to wheels 22 and 24. A tongue 26 may extend longitudinally forward from the frame. The illustrated trailer 10 comprises a trailer hitch connector in the form of a coupler assembly 28. The coupler assembly 28 is connected to a vehicle 12 via a hitch ball 30, which may be connected to the vehicle 12 by a drawbar. In operation, the coupler assembly 28 may latch onto the hitch ball 30 to provide a pivoting hitch point 32 or coupling interface that allows for articulation of the trailer angle γ between the vehicle 12 and the trailer 10. In operation, the system may provide for the determination of a position and height of the hitch ball 30 and the corresponding location of the trailer-vehicle interface to assist in the control and navigation of the connected vehicle 12 and trailer 10.

As shown in FIG. 3, the trailer angle γ is shown in relation to a number of parameters of the vehicle 12 and the trailer

10. In operation, the kinematic model depicted in FIG. 3 may be utilized as the basis for the system 8 to control the navigation of the vehicle 12 to direct the trailer 10 along a calculated path. During such operations, the system 8 may monitor the trailer angle γ to ensure that the trailer 10 is accurately guided by the vehicle 12. The parameter that may be utilized for the model include, but are not limited to, the following:

δ: steering angle at steered wheels 40 of the vehicle 12;
α: yaw angle of the vehicle 12;
β: yaw angle of the trailer 10;
γ: trailer angle between the vehicle 12 and the trailer 10 (γ=β−α);
W: wheelbase length between a front axle 42 and a rear axle 44 of the vehicle 12;
L: drawbar length between the hitch point 32 and the rear axle 44 of the vehicle 12; and
D: trailer length between the hitch point 32 and axle 20 of the trailer 10 or effective axle for multiple axle trailers.

It should be appreciated that additional embodiments of the trailer 10 may alternatively couple with the vehicle 12 to provide a pivoting connection, such as by connecting with a fifth wheel connector. It is also contemplated that additional embodiments of the trailer 10 may include more than one axle and may have various shapes and sizes configured for different loads and items, such as a boat trailer or a flatbed trailer.

In some embodiments, the towing assist system 8 may also include the imaging device 14 located at the rear of the vehicle 12 and configured to image a rear-vehicle scene. The imaging device 14 may be centrally located at an upper region of a vehicle tailgate 46, such that the imaging device 14 is elevated relative to the tongue 26 of the trailer 10. The field of view 18 of the imaging device 14 or camera may be directed rearward from the vehicle 12 and oriented to capture one or more images that may include the tongue 26 of the trailer 10 and the hitch ball 30, or more generally, a connection interface. Captured images or image data may be supplied to a controller 50 of the towing assist system 8. As discussed herein, the image data may be processed by the controller 50 to determine the coupler height $H_C$ and a coupler position $P_C$ relative to a known or previously identified position of the camera or imaging device 14. In this way, the controller 50 may detect and identify the coupler height $H_C$ and a coupler position $P_C$ to assist in the assisted operation of the vehicle 12 in combination with the trailer 10.

Referring now to FIG. 2, the controller 50 may comprise one or more processors 52 and/or other analog and/or digital circuitry for processing one or more logic routines stored in a memory 54. The logic routines may include one or more detection routines 56 configured to detect various aspects of the vehicle-trailer including the position and height of the hitch ball 30 relative to the vehicle 12. The location of the hitch ball 30 may be of particular importance, because the hitch position defines the pivoting hitch point 32 or coupling interface about which the trailer angle γ varies between the vehicle 12 and the trailer 10. The detection routines 56 may include one or more image processing routines, computer vision algorithms, and/or neural networks configured to identify the trailer 10 and corresponding dimensions in image data or data captured by additional proximity or detection sensors. Based on the dimensions of the trailer 10 and the relationship of the trailer 10 to the vehicle 12, the system may implement operating routines 58 to guide the vehicle 12 along a selected or determined path.

The processor 52 of the controller 50 may include one or more digital processing devices including, for example, a central processing unit (CPU) with one or more processing cores, a graphics processing unit (GPU), digital signal processors (DSPs), field programmable gate arrays (FPGAs), application specific integrated circuits (ASICs), and the like. In some configurations multiple processing devices may be combined into a System on a Chip (SoC) configuration, while in other configurations the processing devices may correspond to discrete components. The memory 54 may comprise one or more data storage devices including, for example, magnetic or solid state drives and random access memory (RAM) devices that store digital data. The memory 54 may include one or more stored program instructions, object detection templates (e.g., marker templates), image processing algorithms, etc. In operation, the processor 52 executes program instructions stored in the memory 54 to perform the operations described herein.

Though the disclosed systems may be implemented in combination with various control and detection schemes or sensors, the primary aspects of the application relate to the processing of imaging data from the imaging device 14. In general, the imaging device 14 or other components of the towing assist system 8 may be supplied to the controller 50 via a communication network of the vehicle 12, which can include a controller area network (CAN), a local interconnect network (LIN), or other conventional protocols used in the automotive industry. It should be appreciated that the controller 50 may be a stand-alone dedicated controller or may be a shared controller integrated with the imaging device 14 or other component of the towing assist system 8 in addition to any other conceivable onboard or off-board vehicle control systems.

In an exemplary embodiment, the controller 50 of the towing assist system 8 may be configured to communicate with a variety of vehicle equipment. The towing assist system 8 may include a vehicle sensor module 60 that monitors certain dynamics of the vehicle 12. The vehicle sensor module 60 may generate a plurality of signals that are communicated to the controller 50 and may include a vehicle speed signal generated by a speed sensor 62 and a vehicle yaw rate signal generated by a yaw rate sensor 64. More generally, the sensor module 60 may correspond to an inertial sensor that may correspond to an accelerometer, gyroscope, magnetometer, and/or various similar sensory devices. A steering input device 66 may be provided to enable a driver to control or otherwise modify the desired curvature of the backing path of the trailer 10.

The steering input device 66 may be communicatively coupled to the controller 50 in a wired or wireless manner. In this configuration, steering input device 66 may provide the controller 50 with information defining the desired curvature of the backing path of the trailer 10. In response, the controller 50 may process the information and generate corresponding steering commands that are supplied to a power assist steering system 68 of the vehicle 12. In some embodiments, the steering input device 66 may comprise a rotatable knob 70 operable to rotate to positions that may correspond to an incremental change to the desired curvature of a backing path of the trailer 10.

According to some embodiments, the controller 50 of the towing assist system 8 may control the power assist steering system 68 of the vehicle 12 to operate the steered wheels 40 to direct the vehicle 12 in such a manner that the trailer 10 reacts in accordance with the desired curvature of the backing path of the trailer 10. The power assist steering system 68 may be an electric power-assisted steering (EPAS) system that includes an electric steering motor 74 for turning the steered wheels 40 to a steering angle δ based on a steering command generated by the controller 50. In this configuration, the steering angle δ may be sensed by a steering angle sensor 76 of the power assist steering system 68 and provided to the controller 50. The steering command may be provided for autonomously steering the vehicle 12 during a backup maneuver and may alternatively be provided manually via a rotational position (e.g., a steering wheel angle) of the steering input device 66 or the rotatable knob 70.

In some embodiments, the steering input device 66 (e.g. steering wheel) of the vehicle 12 may be mechanically coupled with the steered wheels 40 of the vehicle 12, such that the steering input device 66 may move in concert with steered wheels 40 via an internal torque, thereby preventing manual intervention with the steering input device 66 during autonomous steering of the vehicle 12. In such instances, the power assist steering system 68 may include a torque sensor 80 that senses torque (e.g., gripping and/or turning) on the steering input device 66, which may not be expected from autonomous control of the steering input device 66. Such unexpected torque may be detected by the controller 50 to indicate manual intervention by the driver. In some embodiments, external torque applied to the steering input device 66 may serve as a signal to the controller 50 that the driver has taken manual control and for the towing assist system 8 to discontinue autonomous steering functionality.

The controller 50 of the towing assist system 8 may also communicate with a vehicle brake control system 82 of the vehicle 12 to receive vehicle speed information, such as individual wheel speeds of the vehicle 12. Additionally or alternatively, vehicle speed information may be provided to the controller 50 by a powertrain control system 84 and/or the speed sensor 62, among other conceivable means. It is conceivable that individual wheel speeds may be used to determine a vehicle yaw rate, which can be provided to the controller 50, in the alternative or in addition to the vehicle yaw rate measured by the yaw rate sensor 64 of the vehicle sensor module 60. In some embodiments, the controller 50 may provide braking commands to the vehicle brake control system 82, thereby allowing the towing assist system 8 to control the speed of the vehicle 12 during a backup maneuver of the trailer 10. It should be appreciated that the controller 50 may additionally or alternatively control the speed of the vehicle 12 via interaction with the powertrain control system 84.

According to some embodiments, the controller 50 may communicate with one or more devices, including a vehicle alert system 86, which may prompt visual, auditory, and tactile notifications. For instance, vehicle brake lights 88 and vehicle emergency flashers may provide a visual alert and a vehicle horn 90 and/or speaker 92 may provide an audible alert. Additionally, the controller 50 and/or vehicle alert system 86 may communicate with a human machine interface (HMI) 85 of the vehicle 12. The HMI 85 may include a touchscreen vehicle display 96, such as a center-stack mounted navigation or entertainment display capable of displaying images indicating the alert. Such an embodiment may be desirable to notify the driver of the vehicle 12 that an unacceptable trailer backup condition is occurring. Further, it is contemplated that the controller 50 may communicate via wireless communication with one or more electronic portable devices, such as portable electronic device 98, which is shown embodied as a smartphone. The portable electronic device 98 may include a display for displaying one or more images and other information to a user. In response, the portable electronic device 98 may provide feedback information, such as visual, audible, and tactile alerts.

Figure 4:
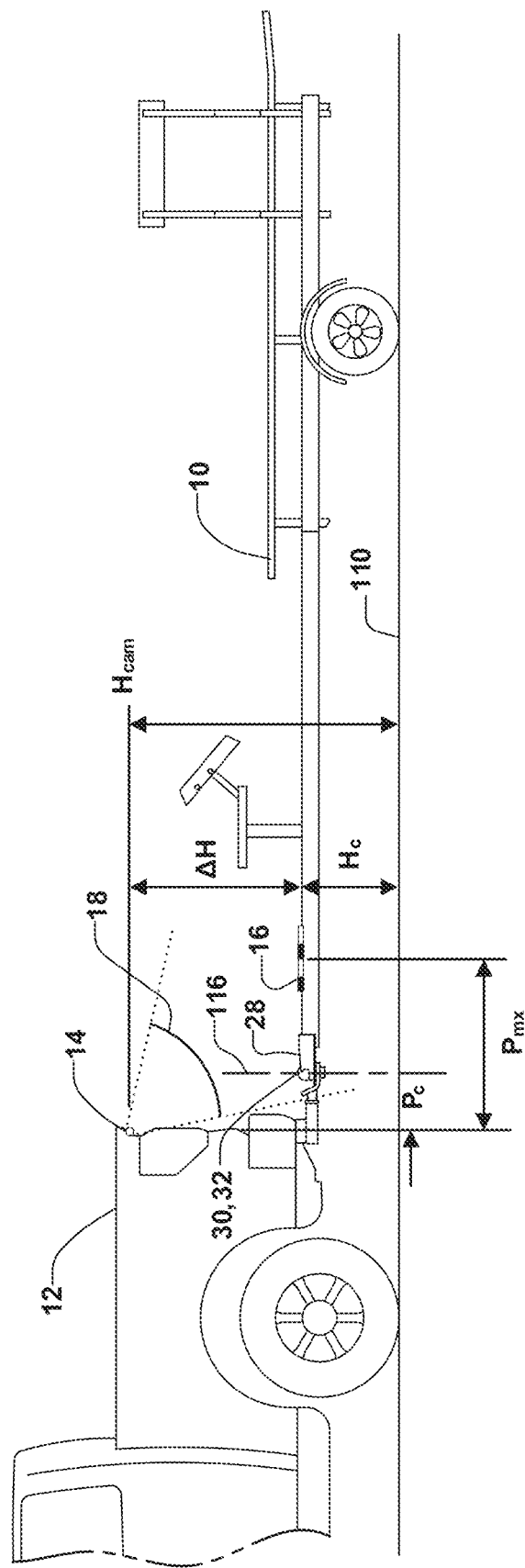
FIG. 4 is a side view of a vehicle and trailer demonstrating a camera module and distinctive marker connected to the trailer.
Figure 5:
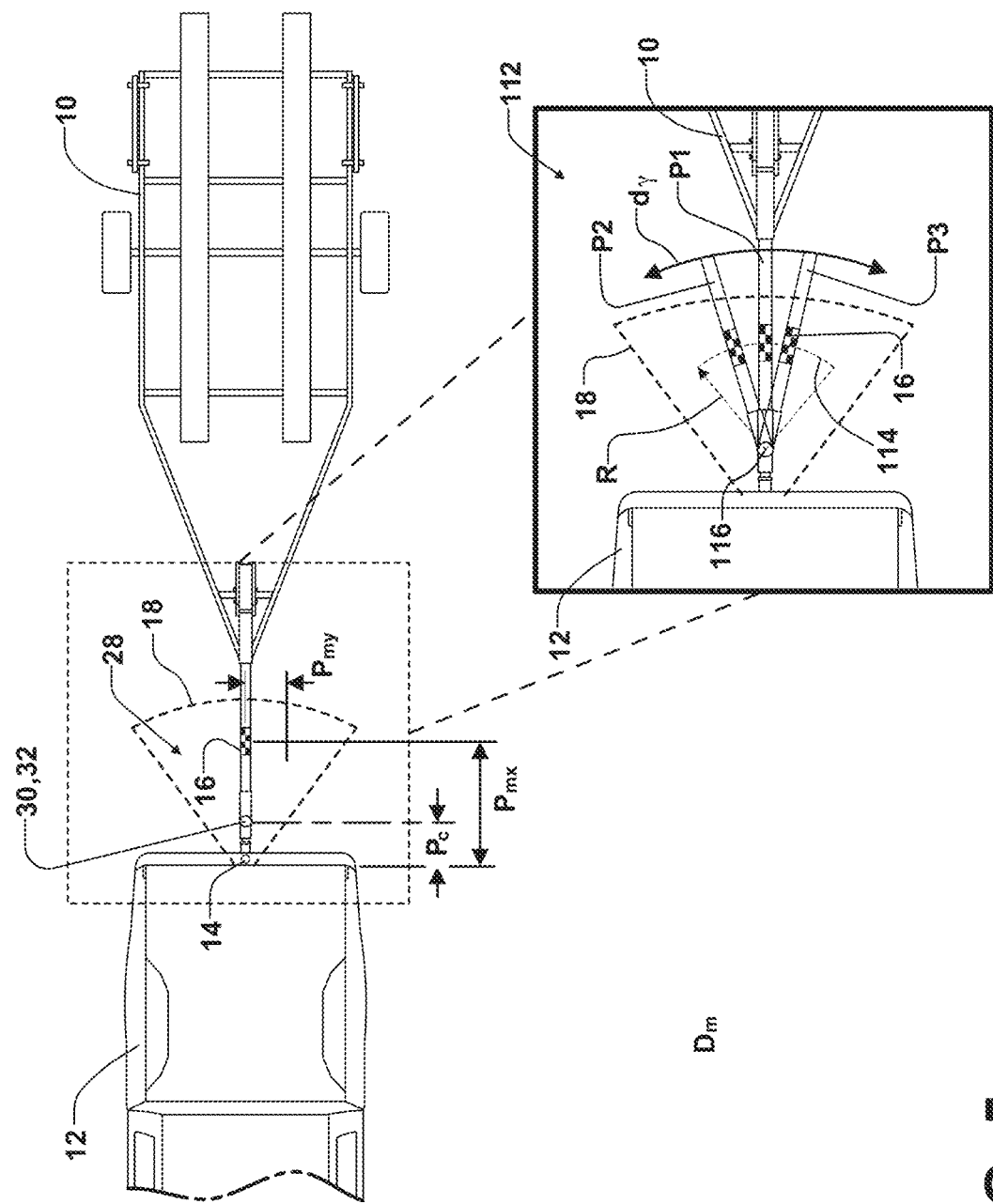
FIG. 5 is a top view of a vehicle and trailer demonstrating a camera module and distinctive marker connected to the trailer.

Referring now to FIGS. 4 and 5, top and side views of the vehicle 12 and trailer 10 are shown demonstrating the camera or imaging device 14 capturing image data of the characteristic marker 16 in the field of view 18. In operation, the controller 50 of the system 8 may be configured to identify the coupler height of the coupler assembly 28, as well as the coupler position $P_C$ of the hitch point 32 or connection interface by capturing the image data in the field of view 18 demonstrating the characteristic marker 16. To identify the coupler height $H_c$ and/or the coupler position $P_c$, the system 8 may rely on processing the image data demonstrating the characteristic marker 16 and determining the position data defining the kinematic relationship between the vehicle 12 and the trailer 10 based on known proportions, scale, or other identifying characteristics of the characteristic marker 16. As discussed specifically in reference to FIGS. 7 and 8, the controller 50 of the system 8 may process the image data captured by the camera 14 to identify the characteristic marker 16 and compare positional information related to the marker 16 to identify the coupler height $H_c$ and/or coupler position $P_c$. In this way, the system 8 may determine the height and position of the hitch point 32 or connection interface without apriori programming or measurement of the position of the marker 16 in connection with the trailer 10.

In general, the coupler height $H_c$ and the coupler position $P_c$ may be identified in the image data captured by the camera 14 by normalizing or transforming the image data representing the marker 16 to correspond to a top or bird's-eye view oriented normal to a primary surface of the characteristic marker 16. For example, the controller 50 may comprise an image augmentation module in the memory 54 that may include various routines (e.g., scaling, rotation, cropping, etc.) configured to correct and adjust the scaling for projection of the marker 16 represented in the image data due to the angular perspective of the camera 14 relative to the marker 16. The processor 52 of the controller 50, for example, may process and modify the image data representing the characteristic marker 16, such that one or more geometric shapes or patterns conforms to the relationship as demonstrated in the bird's-eye view of the marker 16 normal to the primary surface. In some cases, the characteristic marker 16 may incorporate parallel opposing perimeter lines and rectangular or square interior shapes that may be readily modified or augmented in the image data to ensure that the relative proportions and positions are parallel, perpendicular, and/or conform to a known ratio of length. In this way, the controller 50 may modify the image data representing the characteristic marker 16 in the field of view 18 from an angled or skewed perspective to the bird's-eye or top view of the marker 16 taken from a direction normal to the primary surface. The system 8 may thus identify the proportions of the marker 16 in the image data and compare the representation of the marker 16 to one or more templates to further identify the coupler height $H_c$ and/or coupler position $P_c$ of the coupler assembly 28.

Once the normalized representation of the marker 16 is determined by the controller 50, the system 8 may compare the relative proportions of the marker 16 to one or more known representative scales based on the optical properties and scaling of the camera 14, which may be calibrated or measured upon manufacture. For example, the controller 50 may compare the image data demonstrating the marker 16 to one or more templates demonstrating a known scale of the marker 16 at various predetermined distances. The predetermined distances and corresponding proportions of the marker 16 may vary of an expected range of height differences represented in FIG. 4 as Δh. The predetermined distances may correspond to a range of the height differences Δh associated with the distance between the coupler height $H_c$ and the camera height $H_{cam}$ for vehicles compatible with the system 8 (e.g. towing vehicles). In this way, the system 8 may easily be implemented with a variety of vehicles having differing proportions without the need for custom programming.

As discussed herein, the scaled templates of the marker 16 may be compared to the image data demonstrating the marker 16 to determine the scale and corresponding distance or height difference Δh between the coupler height $H_c$ and the camera height $H_{cam}$. Once a matching template is identified for a best match solution among the templates, the controller 50 may identify the height difference Δh between the camera 14 and the coupler assembly 28 on which the characteristic marker 16 is affixed. With the height difference Δh calculated, the controller 50 may subtract the height difference Δh from a known height $H_{cam}$ of the camera 14 to determine the coupler height $H_c$. In this way, the system 8 may be operable to identify the height of the marker 16 and the corresponding height of the coupler assembly 28 based on the image data captured by the camera 14 without requiring that the characteristic marker 16 be affixed in a known position on the trailer 10. Stated differently, the controller 50 may identify the coupler height $H_c$ and the coupler position Pc as later discussed based on the representation of the marker 16 in the image data, even though the position of the marker 16 in the image data is in an indeterminate location that is not previously programmed or measured.

Referring still to FIGS. 4 and 5, FIG. 5 represents image data captured demonstrating the trailer 10 at a plurality of trailer angles γ relative to the vehicle 12. As discussed in further detail in reference to FIG. 8, the controller 50 may identify the coupler position $P_c$ based on a known or previously programmed scale of the characteristic marker 16 captured in a plurality of rotational orientations relative to the vehicle 12 that may result from variations in the trailer angle γ. As previously discussed, the determination of the coupler position $P_c$ by the controller 50 may begin by modifying the image data to represent the characteristic marker 16 from a top or bird's-eye view normal to the primary surface. As shown in FIG. 4, a marker distance $P_{mx}$ to a center or consistently referenced portion of the marker 16 may be identified by the controller 50 to determine a relative position of the marker 16 relative to the camera 14 along a ground plane 110. In order to determine the coupler position $P_c$, the trailer angle γ between the vehicle 12 and the trailer 10 may be adjusted as the vehicle is operated through normal turning operations to capture representations of the characteristic marker 16 in a plurality of trailer angles γ.

As shown in the detailed view 112 in FIG. 5, the position of the characteristic marker 16 is shown in a plurality of positions demonstrated as $P_{mx}$, $P_{my}$ (e.g., a first position P1, second position P2, third position P3) that vary based on angle changes dγ in the trailer angle γ. At each positon P1, P2, P3 of the marker 16, the controller 50 may identify a corresponding angular orientation and center or reference position of the marker 16. The detected positions of the marker 16 may be saved in the memory 54. Once a number N of the positions and orientations are identified, the controller 50 may calculate a radius R of an arc 114 and fit the arc 114 to the positions (e.g., P1, P2, P3) of the marker 16.

A center point 116 of the arc 114 may correspond to the hitch point 32 or connection interface between the vehicle 12 and the trailer 10. Accordingly, based on the radius R of the arc 114 as determined by the position of the marker 16 at the plurality of trailer angles γ, the controller 50 may identify an intersection of the varying depictions of the characteristic marker 16 to identify the center point 116 of the arc 114 and the corresponding position of the connection interface or hitch point 32 defined by the coupler position $P_c$. In this way, the system 8 may be configured to identify the coupler position $P_c$ based on representations of the marker 16 captured at a plurality of trailer angles γ.

Figure 6B:
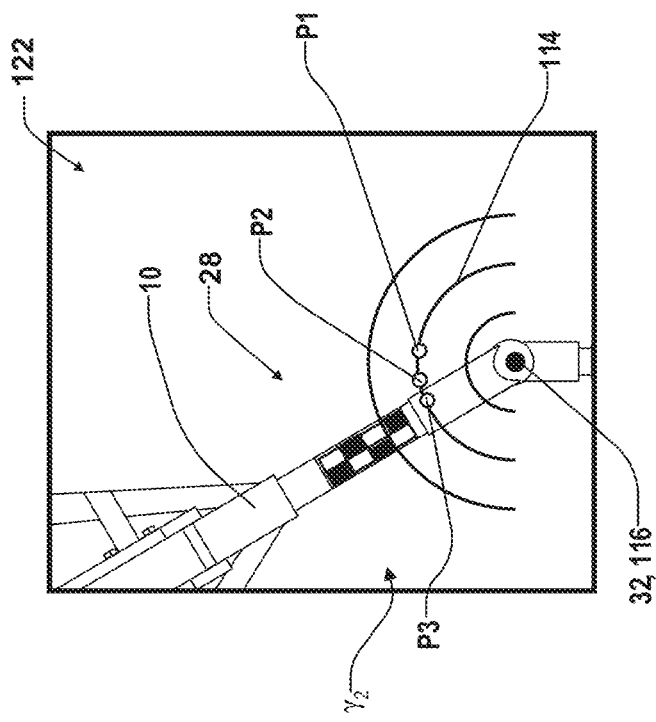
FIG. 6B is a bird's-eye or top view of image data processed to determine a height and position of a hitch ball of the vehicle in connection with a trailer.
Figure 6B:
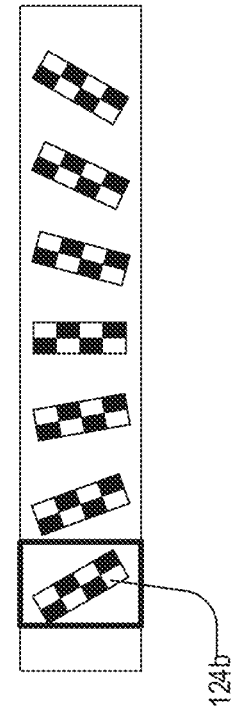
Figure 6A:
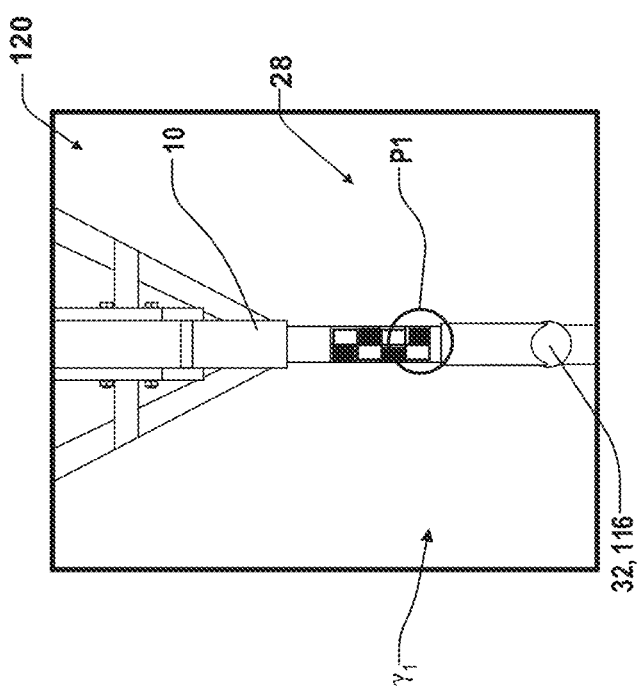
FIG. 6A is a bird's-eye or top view of image data processed to determine a height and position of a hitch ball of the vehicle in connection with a trailer.
Figure 6A:
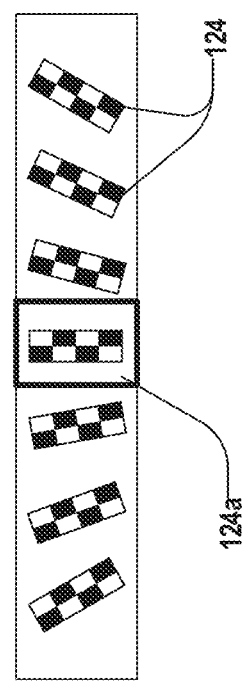

Referring now to FIGS. 6A and 6B, a first top view 120 and a second top view 122 of the coupler assembly 28 are shown at a first hitch angle $γ_1$ and a second hitch angle $γ_2$, respectively. As previously discussed, the normalized view of the marker 16 may be processed by the controller 50 at a plurality of trailer angles $γ_1$, $γ_2$, $γ_3$, etc. to determine the coupler position $P_c$ of the hitch point 32 or connection interface. As shown in FIG. 6A, the vehicle 12 and trailer 10 are approximately aligned, and a first template 124a of a plurality of templates 124 is identified by the controller 50 to match the representation of the marker 16 in the modified image data. Similarly, the controller 50 may determine that the second template 124b of the plurality of templates 124 matches the representation of the marker 16 in the modified image data represented in the second view 122. As the trailer angle γ between the vehicle 12 and trailer 10 changes with the operation of the vehicle 12, the controller 50 may continue to determine changes in the marker positions P1, P2, P3, etc. and fit the resulting arc 114 to the detected positions P1, P2, P3, etc. In some implementations, the controller 50 may calculate the radius R of the arc 114 and the corresponding center point 116 once the characteristic marker 16 is identified at three different trailer angles (e.g., $γ_1$, $γ_2$, $γ_3$) and three corresponding positions P1, P2, P3, etc. Based on this information, the controller 50 may determine the coupler position $P_c$ of the hitch point 32 or connection interface based on the image data representing the marker 16. In order to ensure that the accuracy of the coupler position $P_c$ is maintained, the system 8 may periodically or consistently update the calculation of the center point 116 based on new representations of the marker 16 in the image data captured by the camera 14 as the vehicle 12 is operated.

Figure 7:
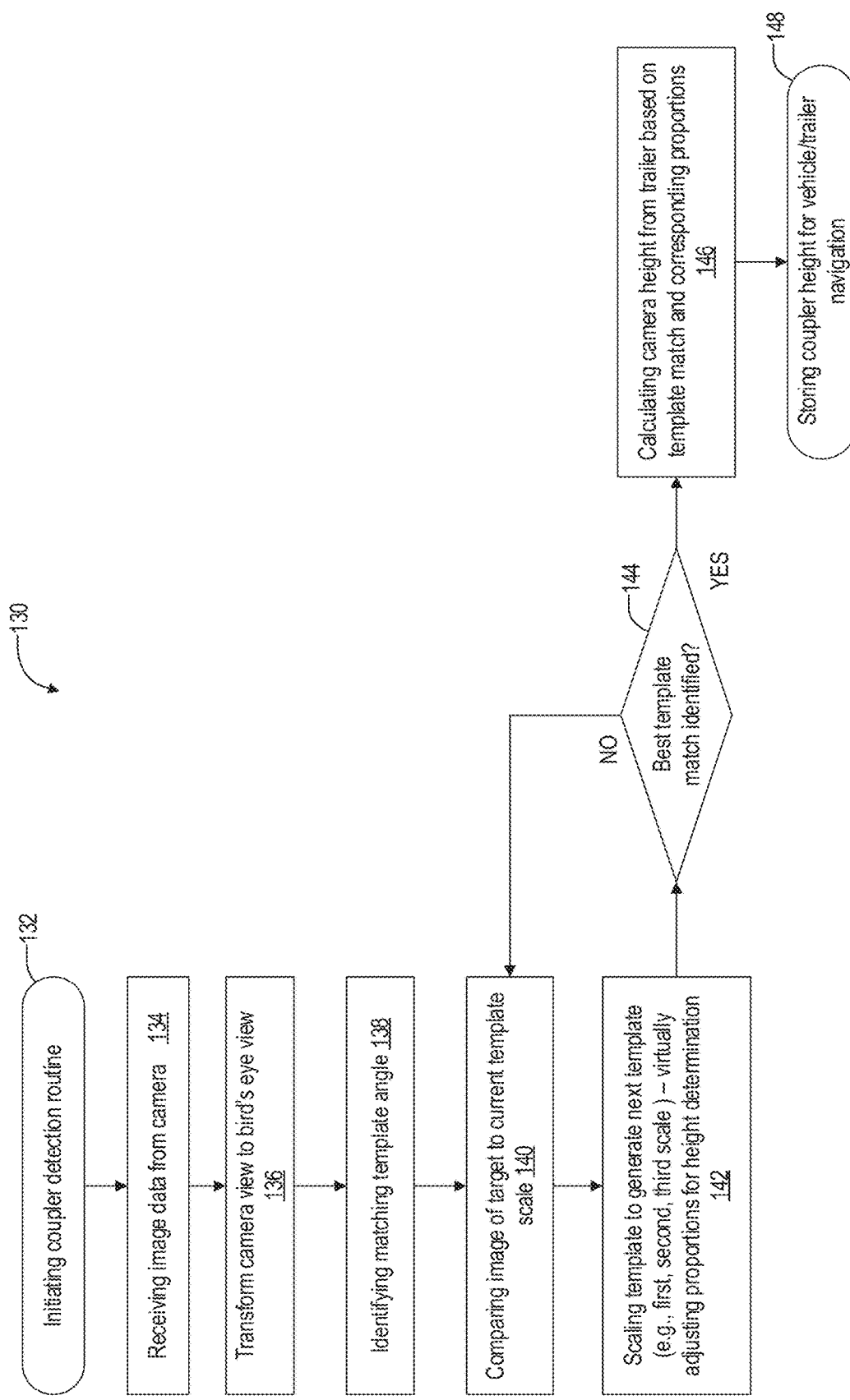
FIG. 7 is a flowchart demonstrating a method for determining a height of a hitch ball of a vehicle relative to a camera height.

Referring now to FIG. 7, a flowchart is shown demonstrating a method 130 of identifying the coupler height $H_c$ as discussed herein. The method 130 may begin at step 132 by initiating a detection routine for the coupler assembly 28. The routine may begin by capturing image data with the camera 14 (132). Once the image data is captured, the controller 50 may modify and transform the image data, such that the marker 16 is represented in a top or bird's-eye view normal to the primary surface (136). With the normalized representation of the marker 16 from the image data, the method 130 may continue in steps 138 and 140 to identify a matching template angle of the marker 16 (138) and identify a scale of the marker 16 (140). The comparison of the template angle and scale may be processed by the controller 50 by comparing the modified image data represented in the top or bird's-eye view to the plurality of templates 124 to find a best fit match.

As discussed herein, the best fit match may correspond to a proportional or scaled representation of the marker 16 that aligns closest to the representation of the characteristic marker 16 represented in the modified image or pixel data captured by the camera 14. The determination of the best fit match may be processed by sequentially or recursively comparing the scaled templates of the marker 16 to the representation of the marker 16 in the image data. The comparison may include comparing known proportions of templates of the marker 16 in pixels to corresponding features of the marker 16 identified in the image data. Accordingly, steps 142 and 144 may include repeated comparisons of a scale or angular representation of the templates 124 to the marker 16 in the modified image data to determine a best fit match between the template 124 and the marker 16. Once the best fit match between the template 124 and the marker 16 is identified by the system 8, the controller 50 may continue by calculating the height of the trailer 10 based on the corresponding proportions of the template 124 and the apriori or prior programmed information of the camera height $H_c$ of the camera 14 in connection with the vehicle 12 (146). Once calculated, the controller 50 may store the coupler height $H_c$ and implement the information through a system operation of the vehicle 12 in combination with the trailer 10 (148).

Figure 8:
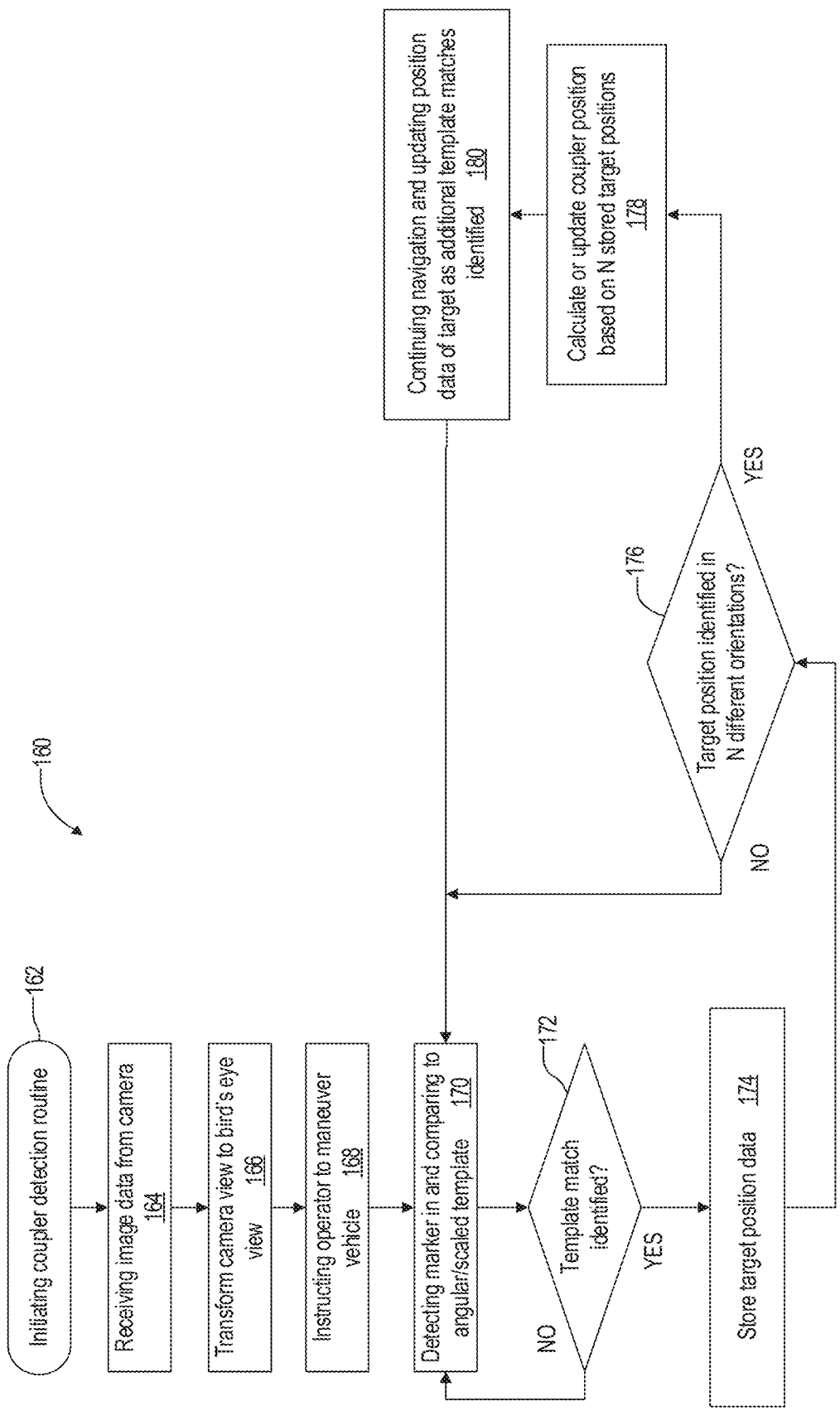
FIG. 8 is a flowchart demonstrating a method for determining a position of a hitch ball of a vehicle relative to a camera of the vehicle in accordance with the disclosure.

Referring now to FIG. 8, a flowchart is shown demonstrating a method 160 for identifying the coupler position $P_c$ of the hitch point 32 or connection interface. The method 160 may begin by initiating a coupler detection routine (162) and activating the camera 14 to capture image data representing the characteristic marker 16 (164). Once captured, the image data representing the characteristic marker 16 may be transformed or modified, such that the marker 16 is represented in a top or bird's-eye view normal to the primary surface (166). As previously discussed, the determination of the coupler position $P_c$ may be identified based on a plurality of representations of the marker 16 captured at various trailer angles γ. Accordingly, the method 160 may continue by instructing an operator or otherwise controlling the vehicle 12 to maneuver the vehicle 12 and trailer 10 to adjust the trailer angle γ (168). Such instructions may be communicated via the vehicle display 96 or may be captured based on the typical or commonplace operation of the vehicle 12 without providing such instructions. Accordingly, the towing assist system 8 may be flexibly implemented in a variety of ways.

As previously discussed, the marker 16 as represented in the image data may be compared to a plurality of angular templates (170). In step 172, the marker 16 represented in the modified or bird's-eye image data may be compared to the various angles or scaled templates to identify a best match of the marker 16 to one of the templates 124 (172). Once a best match template is identified for the representation of the marker 16 in the image data, the marker position $P_{mx}$, $P_{my}$ (see FIG. 5) for the marker 16 may be calculated by the controller 50 and the positions P1, P2, P3, etc. of the marker 16 may be stored in the memory 54 (174). Following step 174, the controller 50 may determine whether a sufficient number of instances of the image data matching the templates and the corresponding positions of the marker P1, P2, P3 have been identified, such that the arc 114 and corresponding radius R may be calculated. As previously discussed, the controller 50 may be operable to calculate the center point 116 of the arc 114 by matching the arc 114 to best fit two or more of the positions of the marker 16 identified in the image data at different trailer angles γ. Accordingly, in step 176, the controller 50 may be configured to determine whether the marker position $P_{mx}$, $P_{my}$ for the marker 16 has been identified in the requisite number N of orientations based on variations in the trailer angle γ between the vehicle 12 and the trailer 10. As discussed herein, the number of orientations N is described as three angular orientations; however, the number of orientations may vary based on the sophistication of the calculation strategy as well as additional information that may be determined from the proportions of the marker 16 as represented in the image data.

Once the marker position $P_{mx}$, $P_{my}$ is identified by the controller 50 in the number N of different orientations, the controller 50 may calculate or update the coupler position $P_c$ based on the arc 114 and corresponding radius R among the marker positions P1, P2, P3 (178). In some cases, the number N of orientations may be N=3, for example in cases where the controller 50 identifies the coupler position $P_c$ of the hitch point 32 based on the best fit arc 114. In some cases, the number N of orientations may be N=2, for example in cases where the controller 50 processes a combination of two or more marker positions $P_{mx}$, $P_{my}$ and corresponding angular orientations of the marker 16 to identify an intersection of the maker positions P1, P2 and rays extending along the corresponding angles that intersect at the center point 116 of the arc 114. Accordingly, based on the known proportions of the marker 16, the center point 116 of the arc 114 may be utilized by the controller 50 to identify the coupler position $P_c$ of the hitch point 32 or connection interface between the vehicle 12 and the trailer 10.

Once the coupler position $P_c$ is identified in step 178, the controller 50 may continue to process the method 160 and update the coupler position $P_c$ based on later detected template matches that may be processed to identify variations in the arc 114, radius R, and corresponding center point 116 (180). In this way, the controller 50 may continue to monitor and determine the coupler position $P_c$ by eliminating outlying information which may correspond to mismatches in the detection process. Accordingly, the methods and systems described herein may provide for the accurate and simplified calculation of the coupler height $H_c$ and/or the coupler position $P_c$ based on the representation of the marker 16 in the image data captured by the camera 14 without requiring that the marker 16 be located in a predetermined position relative to the trailer 10 or the vehicle 12.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A towing assist system for a vehicle comprising:
   a marker positioned on a trailer;
   an imaging device in connection with the vehicle and configured to capture image data demonstrating a rearward-directed field of view; and
   a controller that:
   processes the image data depicting the characteristic marker;
   detects the characteristic marker in the image data;
   compares a scale of the characteristic marker in the image data to a plurality of scaled templates;
   identifies a closest match template of the plurality of scaled templates;
   calculates a coupler height of a coupling interface of the trailer based on a scale of the closest match template; and
   identifies a coupler position of the coupling interface of the trailer in response to a position of the marker in at least one frame of the image data.

2. The system according to claim 1, wherein the marker comprises a plurality of shapes or characters, and the controller is configured to access a template and identify a relative scale of the marker in the image data.

3. The system according to claim 1, wherein the marker is affixed to the trailer within the field of view in an indeterminate location relative to the coupler position.

4. The system according to claim 3, wherein the indeterminate location of the marker is not predetermined or accessible in a memory of the controller prior to the identification of the coupler position by processing the image data.

5. The system according to claim 1, wherein the controller is further configured to:
transform a perspective of the image data to a view perpendicular to the marker or a bird's-eye view.

6. The system according to claim 1, wherein the controller is further configured to:
detect a template angle of the characteristic marker in the image data; and
select a closest match template based on the template angle.

7. The system according to claim 1, wherein the controller is further configured to:
identify a plurality of marker positions of the marker at a plurality of different trailer angles; and
store the plurality of marker positions identified at the plurality of different trailer angles.

8. The system according to claim 1, wherein the controller is further configured to:
identify a plurality of marker positions of the marker at the plurality of different trailer angles in response to the vehicle being maneuvered along a path that changes a template angle of the marker based on the trailer angle.

9. The system according to claim 8, wherein the controller is further configured to:
determine a radius of an arc fit to the marker positions at the plurality of different trailer angles.

10. The system according to claim 9, wherein the controller is further configured to:
identify the position of the coupling interface based on radius and arc of the marker positions at the plurality of different trailer angles.

11. The system according to claim 1, wherein the marker comprises one or more features comprising at least one characteristic shape, character, or symbol, and the proportions of the features are predefined and accessible by the controller.

12. A towing assist system for a vehicle comprising:
a marker positioned on a trailer, wherein the marker is affixed to the trailer within the field of view in an indeterminate location relative to a coupler position;
an imaging device in connection with the vehicle and configured to capture image data demonstrating the marker in a rearward-directed field of view; and
a controller that:
processes the image data depicting the characteristic marker;
detects the marker in the image data at each of the plurality of trailer angles;
identifies a scale of the marker in the image data relative to a closest match template of the marker; and
calculates the coupler height of a coupling interface of the trailer based on the scale of the closest match template.

13. The system according to claim 12, wherein the coupler position is identified by one of:
identify a plurality of marker positions of the marker at different towing angles between the trailer and the vehicle;
fitting an arc to the plurality of marker positions; and
determining the intersection of rays extending perpendicular to the arc through the marker positions.

14. A towing assist system for a vehicle configured to assist in guiding an operation of the vehicle with a trailer, the system comprising:
an imaging device in connection with the vehicle and configured to capture image data demonstrating a rearward-directed field of view depicting a trailer comprising a characteristic marker; and
a controller that:
processes the image data depicting the characteristic marker in connection with a coupler of the trailer;
calculates a scale of the characteristic marker; and
based on the scale of the characteristic marker, calculates a coupler height of the coupler of the trailer.

15. The towing assist system according to claim 14, wherein the coupler height is determined without a priori programming or measurement of the characteristic marker in connection with the trailer.

16. The towing assist system according to claim 14, wherein the scale of the marker is identified in response to an identification of a scale of a template that represents a closest match to the characteristic marker depicted in the image data to a plurality of marker templates.

17. The towing assist system according to claim 16, wherein the plurality of marker templates depict the characteristic marker at different template angles.

\* \* \* \* \*